Aug. 29, 1939.  H. A. BRASSERT  2,171,353
METHOD FOR THE UTILIZATION OF WASTE HEAT
Filed March 25, 1937
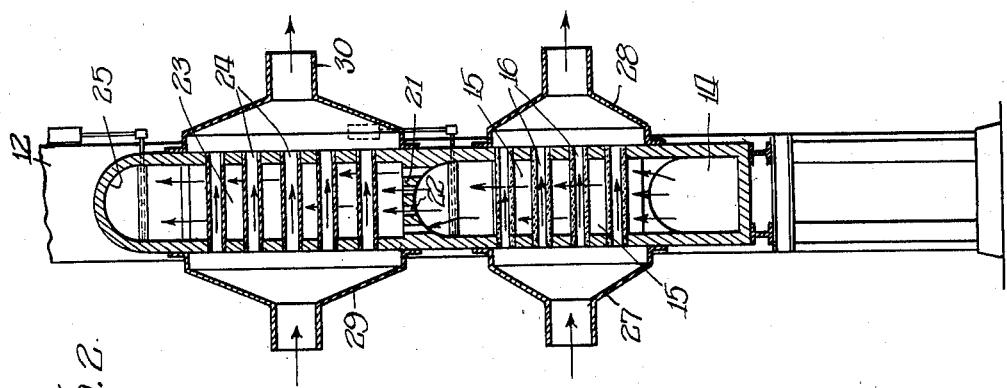
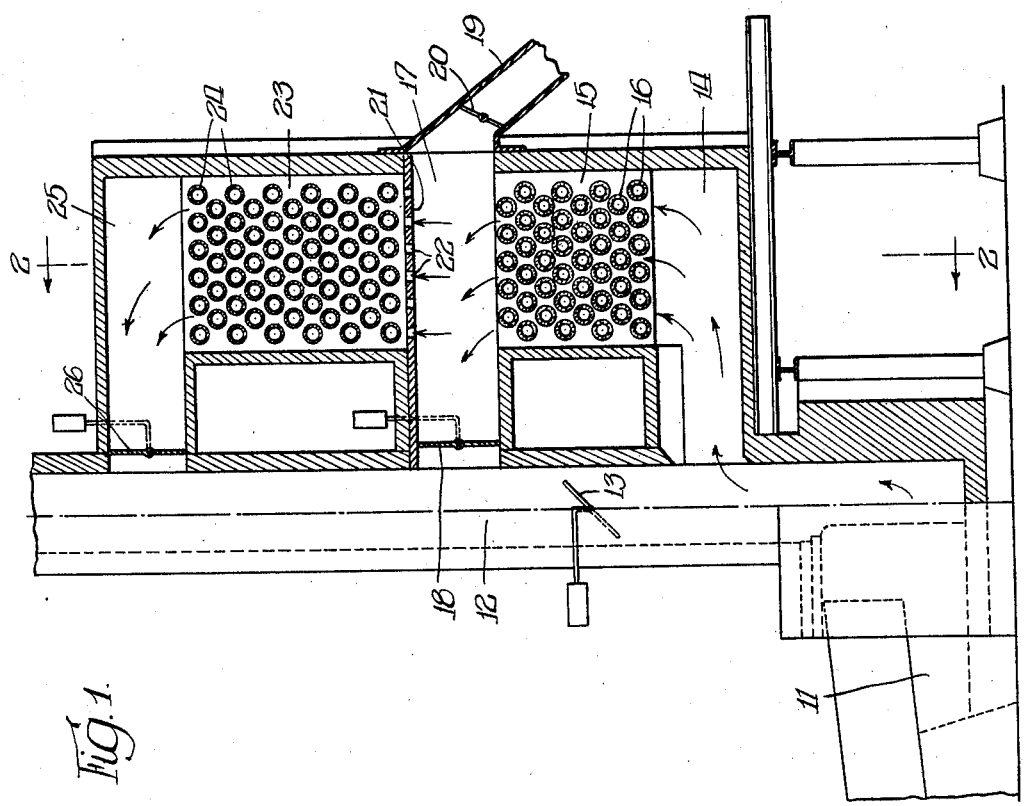
Inventor:
Herman A. Brassert,
By Wilkinson Huxley Byron & Knight
Attys.

Patented Aug. 29, 1939

2,171,353

UNITED STATES PATENT OFFICE 2,171,353

METHOD FOR THE UTILIZATION OF WASTE HEAT

Herman A. Brassert, Bovington, England, assignor to H. A. Brassert & Company, Chicago, Ill., a corporation of Illinois Application March 25, 1937, Serial No. 133,019

1 Claim. (Cl. 263—52)

This invention relates to a new and improved method for the utilization of waste heat from furnaces and particularly for the utilization of such heat in preheating incoming gas and air to the same or other furnaces.

The invention has particular application in connection with blast furnace gases or other gases of low B. t. u. content, and relates to the use of recuperators for heat transfer.

It is well known in the art to heat the air supply to recuperative furnaces by various methods of recuperation, such as by adjacent brick flues, and more recently, by the use of metal and carborundum tubes. The latter are able to stand very high temperatures and also have high conductivity. These carborundum tubes are used principally where the temperature is well above 1000° F., such temperatures precluding the use of steel tubes.

In many steel plants there is a surplus of blast furnace gas which it is desired to use in heating furnaces, for instance, soaking pits. Blast furnace gas has a low thermal value, generally below 100 B. t. u's. per cubic foot and high temperature can only be obtained by its use if the gas is preheated as well as the air for combustion. Owing to the danger of leakage through brick work and also the corrosion of carborundum by blast furnace gas at high temperatures, these heat transfer mediums have not proved satisfactory. The waste gases from soaking pits and other than continuous heating furnaces are generally in the neighborhood of 2000° F., or much higher than the available metal tubes can withstand.

It is an object of the present invention to provide a new and improved method for heat transfer in recuperators and for the better utilization of waste heat.

It is also an object to a new and improved method of preheating both air and gas by recuperative means.

It is a further object to provide a method whereby efficient heat recovery may be had from high temperature waste gases.

It is an additional object to provide a method which is simple, which may be adequately controlled and which is adapted for commercial use.

Other and further objects will appear as the description proceeds.

I have shown somewhat diagrammatically in the accompanying drawing, one form of apparatus which may be used to carry out my improved method.

In the drawing:

Figure 1 is a vertical view, partly in section, showing the apparatus, and

Figure 2 is a vertical section taken in line 2—2 of Figure 1.

The waste gas offtake flue 11 connects with the stack 12 in which is located an adjustable damper 13 but the offtake 14 connects to the stack 12 below the damper 13 and communicates with a recuperator 15 containing a plurality of transversely extending refractory tubes 16 which may preferably be formed of carborundum. The upper face of the recuperator 15 discharges into a flue 17.

As shown in Figure 1 the left end of the flue 17 communicates with the stack 12 above the damper 13, the communication with the stack being controlled by the damper 18. The right end of the flue 17 has connected thereto an air intake passage 19 controlled by damper 20. The roof 21 of the flue 17 is provided with a plurality of openings 22 which communicate with a recuperator 23 containing a plurality of metal tubes 24. The top of the recuperator 23 discharges into the outlet flue 25 which has a connection to the stack 12 controlled by damper 26.

As shown in Figure 2 the gaseous materials to be heated by the recuperator pass transversely through the carborundum tubes 16 and the metal tubes 24. An intake header 27 is provided on one side of the recuperator 15 and a discharge header 28 upon the opposite side of that recuperator. An intake header 29 is provided upon one side of the recuperator 23 and a discharge header 30 is provided on the opposite side of that recuperator.

In carrying out my method by using the forms of apparatus shown, the waste gas, which may be the gases discharged from soaking pits or other heating furnaces, will pass to the stack 12 through the passage 11. This gas may be at a temperature in the neighborhood of 2000° F. and the damper 13 will be adjusted so as to bypass a desired proportion of the gases through the header 14 to the high temperature recuperator 15. Air to be preheated will also be passing through this recuperator; passing through the pipes 16 from the header 27 to the header 28. The waste gas with its temperature considerably reduced, will pass from the recuperator 15 to the flue 17 and from that flue up to the low temperature recuperator 23. The amount and the temperature of the gases passing through the low temperature recuperator 23 may be controlled in a variety of ways. By suitable adjustment of the dampers 18 and 29, a desired proportion of the gas from recuperator 15 may be returned to the stack 12 and the remainder pass through recuperator 23. Another method of controlling the temperature of the gases passing through recuperator 23 lies in the introduction of low temperature air through passage 19 controlled by damper 20. If desired a combination of these two methods may be used and it will be apparent that both the quantity of gases passing through the recuperator 23 and the temperature of such gases may be adjusted through a wide range of variations.

It will be understood that the low B. t. u. content of combustible gas will be passing through the metal tubes 24 of the recuperator 23, this gas being introduced through header 29 and taken off through header 30. In carrying out my method I am able to first heat the air to as high a temperature as consistent with the temperature of the waste gases. The temperature of the waste gases may then be reduced to a suitable temperature for passage through the metal recuperator which temperature may be in the range of from 1200° to 1500°. If the temperature is not adequately reduced through heat transfer in the lower regenerator, the temperature may be controlled as aforesaid by means of the dampers 18, 20 and 26.

While I have described certain preferred methods of carrying out my invention and shown one form of apparatus suitable for use, it will be understood that the method is capable of change to suit varying conditions and requirements and I contemplate such modifications as come within the spirit and scope of the appended claim.

I claim:

The method of utilizing waste heat in hot gases to preheat blast furnace gas and air by recuperation which comprises transferring heat from the waste gas through refractory walls to air to reduce the gas temperature to a degree non-injurious to metal walls and thereafter reducing the temperature of the gas by the admixture of air, transferring additional heat from the mixture of waste gas and air to the blast furnace gas through impervious metal walls.

HERMAN A. BRASSERT.